Figure 5:
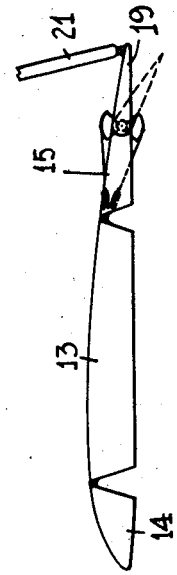

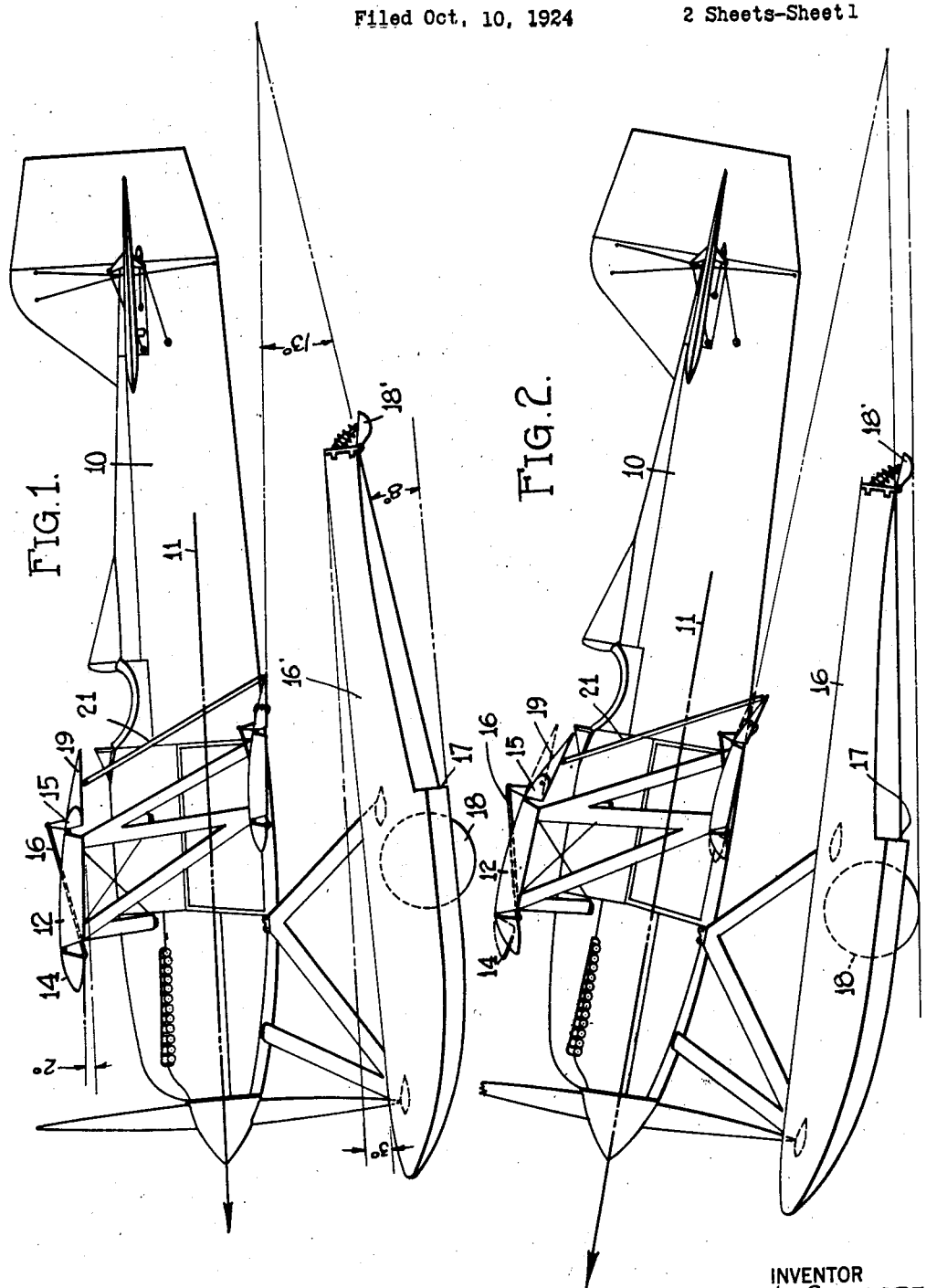

Aug. 16, 1927.

W. L. GILMORE

AEROPLANE

Filed Oct. 10, 1924

1,639,029

2 Sheets-Sheet 2

INVENTOR
WILLIAM L. GILMORE.
BY
ATTORNEY

Patented Aug. 16, 1927.

1,639,029

UNITED STATES PATENT OFFICE.

WILLIAM L. GILMORE, OF MINEOLA, NEW YORK, ASSIGNOR TO CURTISS AEROPLANE & MOTOR COMPANY, INCORPORATED, OF GARDEN CITY, NEW YORK, A CORPORATION OF NEW YORK.

AEROPLANE.

Application filed October 10, 1924. Serial No. 742,823.

My invention relates to aircraft and is concerned more particularly with the scout or reconnaissance type aeroplane designed for ship-board service.

A ship-board machine, above all else, should be light. It should be capable of both land and water operation. It should be capable when operated as a seaplane, of taking off and landing on the water. It should be capable, when operated as a landplane, of taking off under its own power from the deck of an aeroplane carrier and landing either on a landing field or in an arresting gear on ship-board. It should be capable, regardless of its operation, of being catapulted into the air. And it should, under all operating conditions, and especially when operated as a landplane, be capable of landing at a comparatively low landing speed.

"Amphibians", so-called, have heretofore been proposed. Such machines, while capable of land, water and air operation, cannot, and have not, up to the present time, solved the problem of a satisfactory shipboard machine. Most, if not all, "amphibians" are provided with but a single float, are equipped with a retractible land alighting gear, and are more or less complex and cumbersome in construction and operation and therefore exceedingly heavy. To admit of catapulting in launching, a shipboard plane must be light tho rugged. The ordinary seaplane, while capable of being operated as such and of being satisfactorily catapulated, cannot be converted into a landplane without necessitating a removal of the flotation gear and the substitution of a land gear in its stead. If a land gear is merely added to the seaplane, a landing cannot be made on ship-board or on a landing field except at high speed, due principally to the fact that the necessary high lift angle of the wings or supporting surfaces is unobtainable in the ordinary way, i. e., by depressing the tail of the machine and increasing thereby the angle of incidence of the wings. To attempt a low speed landing would, without question, seriously damage the machine thru contact between the float tail and the ground or with the arresting gear should a landing be attempted on shipboard.

The wings of a modern aeroplane are usually set either at a zero angle or at an exceedingly small positive angle to the line of thrust. It is seldom, indeed, in a modern aeroplane that a wing setting beyond 2° positive is provided. For the purpose of simplicity of explanation, I will assume, therefore, that a zero degree setting is normal. I will further assume (and such is a fact) that the stalling angle of a modern aeroplane is somewhere around 16° positive. Such being the case the landing angle must be approximately 16°. Now in an ordinary seaplane having the usual long tail float, the maximum angle accorded the keel line, aft of the step, is 6°; and since the float itself makes a zero degree angle to the line of thrust, 6° only is obtainable in attempting to stall the machine to effect a slow speed landing; e. g., 10° shy of the necessary or at least desirable 16° required for practical operation. Accordingly the ordinary seaplane, even tho equipped with a land alighting gear, is unadapted to slow speed landing when operated as a land machine.

The object of the present invention is to so organize and arrange the float, the fuselage or body and the supporting surfaces of a seaplane as to admit of its operation as a land machine by simply adding to it a land alighting gear. Instead of giving the wings a zero or small positive angle setting to the thrust line they (the wings) are set at a positive angle approximately 2° beyond that angle heretofore considered normal. Instead of giving the float a zero angle setting to the thrust line it (the float) is set at a 3° negative angle. Instead of giving the keel line of the float a 6° upward inclination aft the step, it (the keel line) is given an 8° upward inclination. Instead of using rigid wings or supporting surfaces variable camber wings or variable lift wings which, in effect at least, admit of a 3° gain, are employed. Collectively, therefore, the gain is approximately 10° which, if added to the ordinary 6° obtained from the use of the conventional float, gives a total of 16° obtainable. As above noted, 16° is sufficient to effect a perfect landing at a comparatively low landing speed.

Other objects, advantages and improved results will be hereinafter set forth.

Figure 3:
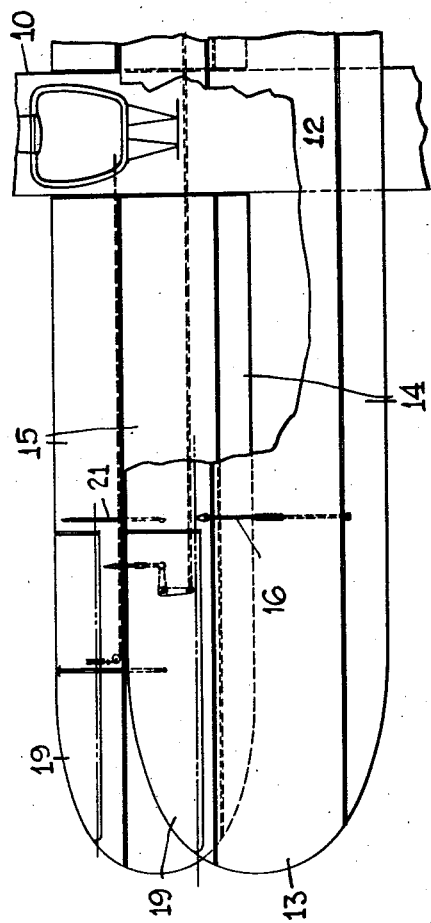
Figure 4:
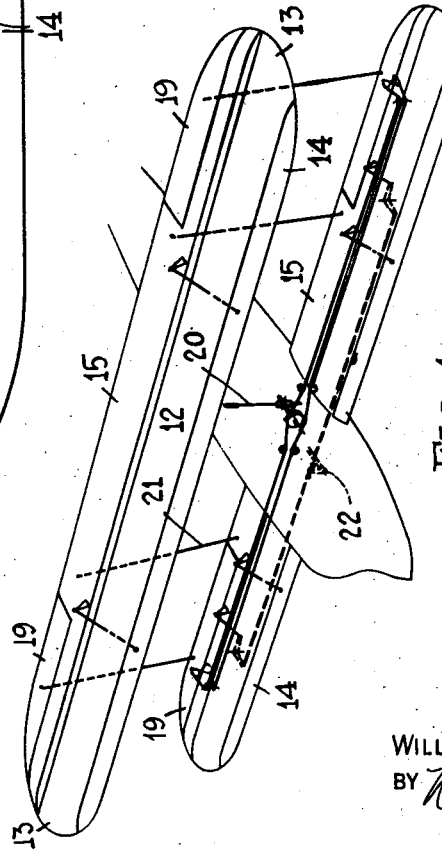

In the drawings, wherein like reference characters denote like or corresponding parts, Fig. 1 is a side elevation of a twin float hydro-aeroplane having its floats, its fuselage and its wings arranged in accordance with the present invention. In this figure the flying attitude of the machine is shown, Fig. 2 is a side elevation of the machine of Fig. 1 showing the relative arrangement of the parts and the attitude of the machine in effecting a low speed landing, Fig. 3 is a plan view of the machine (partly broken away) showing the interconnections between the wing flaps and the ailerons, Fig. 4 is a diagrammatic perspective view of the wing flap and aileron control, and Fig. 5 is an end view of one of the lower wings showing the wing flap and aileron arrangement.

In the embodiment of the invention selected for illustration only the preferred angular arrangement or disposition of the various machine parts is shown. 16° is arbitrarily fixed as the desired angle for the wings or supporting surfaces when biased to assume a stalling or maximum lift angle. The stalling angle, however, may be under different conditions, according to the wing curve selected, slightly greater or slightly less than 16°. A twin float hydro-aeroplane has been selected for the reason that the float arrangement is best adapted to have associated with it a land alighting gear.

In Fig. 1 of the drawings, where the flying attitude of the machine is shown, the fuselage 10, instead of making a zero angle to the line of flight, makes a 2° negative angle, and since the line of thrust, designated as 11, parallels the fore and aft axis of the fuselage, it (the line of thrust) may be said to likewise make a 2° negative angle to the horizontal. The wings or supporting surfaces 12, as intimated, in a modern machine, normally make either a zero angle to the line of thrust or a slight positive angle. In the present invention the wings 12 are set at a 2° greater positive angle to the thrust line than normally; tho in flight, as shown, they assume (where zero degrees is considered normal) a zero angle with respect to the horizontal. Said wings or supporting surfaces 12 are preferably of the variable lift type, and in the present invention may be said to comprise a fixed or central portion 13, a leading edge flap 14 and a tail edge flap 15, the flaps 14 and 15 extending throughout substantially the full length of the fixed or central portion 13 of the wing. Said flaps 14 and 15 are interconnected (see Figs. 1 and 2) by a rigid connecting rod 16 extended diagonally thru the fixed central portion of the wing. Thus connected, the flaps 14 and 15 at all times move similarly and simultaneously either up or down according to whether or not it is desired that the lift coefficient of the wing be increased or diminished. If simultaneously moved down, (see Fig. 2) the effective wing lift is greatly increased, i. e., to an extent approximately equal, in effect, to a 3° greater increase in the angle of incidence of the wings. Thus organized, 3° is gained thru the utilization of a variable lift or variable camber wing. Such an increase, plus the 2° gained thru the 2° setting of the wings adds 5° in favor of the necessary 16° considered as the stalling angle of the machine.

The floats of the conventional twin float seaplane are set at a zero angle to the line of thrust. In the present invention the floats designated at 16, instead of making a zero angle to the line of thrust are set at a 3° negative angle, it having been found by experiment that a small negative setting of the floats 16 will add but little, if any, to the head resistance or drag. Thru such a float setting, 3° have been gained which, if added to the 5° gained as above pointed out, gives an effective gain of 8° toward the desired 16° stalling angle.

A further gain of 2° is obtained by increasing the upward angle of the keel line of the floats aft the step 17. The usual upward inclination accorded the keel line at the point indicated is 6°, whereas in the present invention this angle is increased to 8° and since the 6°, as well as the 2° increase, is instrumental in giving the desired 16° above referred to, obviously the full 16° is in this way obtained.

A seaplane thus organized is especially adapted to ship-board service for reasons above pointed out. If equipped with a land alighting gear such as I have illustrated at 18 and 18' in Figs. 1 and 2, such a machine can be operated as a landplane without any float interference whatsoever. It can be operated as a seaplane and made to land at a much lower landing speed than has heretofore been possible. It can be made to operate as a landplane, by simply adding to the flotation gear, a land alighting structure, the low speed landing when thus equipped being inherent from the arrangement described. Such a machine is especially suited to ship-board service.

Of course, if desired, rigid wings may be used in lieu of variable lift wings. Such wings may be set at an increased angle to effect a further gain in the right direction or, if desired, the 3° gain thru the variable lift feature of the machine may be disregarded and the machine landed at a 13° angle instead of 16° angle, tho at proportionately greater speed and yet at a lower speed than would be possible if the conventional practice were adopted where only 6° are obtainable.

In Figs. 3 to 5 of the drawings a workable arrangement for manipulating the wing flaps 14 and 15, as well as the ailerons designated as 19, is shown. The ailerons 19 are preferably carried by the flaps 15 to move up and down with them and in addition are movable independently of the flaps 15 in the usual manner, i. e., oppositely for the purpose of preserving lateral balance. Suitable control mechanism 20 is provided to manipulate the ailerons. The flaps 15 of both the upper and lower supporting surfaces are interconnected as at 21, suitable control mechanism 22, carried along the lower control surface, being provided to control the movement of said flaps. The flaps 14, as previously noted, move simultaneously with the flaps 15.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What I claim is:

1. An aeroplane adapted to land, water and air operation, characterized by the fact that the supporting surface and the float are both permanently set, the former at a positive angle and the latter at a negative angle to the line of thrust whereby, in effecting a slow speed landing, a high lift angle may be accorded the wing.

2. An aeroplane adapted to land, water and air operation, characterized by the fact that the keel line of the float, aft of the step, is carried rearwardly and upwardly at an angle to the line of thrust greater than 6° and the further fact that the float itself is permanently set at a negative angle to said thrust line whereby, in effecting a slow speed landing, a higher lift angle may be accorded the wings than would be possible in the absence of such characteristics.

3. An aeroplane including a supporting surface having a positive angle of incidence with respect to the line of thrust, and a float provided with a tail portion having its keel line extended upwardly and rearwardly at an angle to said thrust line in excess of 6°, said float, in its entirety, being permanently set at a negative angle with respect to said thrust line whereby, in effecting a slow speed landing, a high lift angle may be accorded the supporting surface.

4. An aeroplane adapted to land, water and air operation, including a supporting surface having a positive angle of incidence of not less than 2° with respect to the line of thrust, a float provided with a tail portion having its keel line extended upwardly and rearwardly at an angle to said thrust line of at least 8°, said float in its entirety, being permanently set at a negative angle with respect to said thrust line of at least 3° whereby, in effecting a slow speed landing, a high lift angle of not less than 13° may be accorded the supporting surface.

5. In a convertible land and water aeroplane, the combination of a supporting surface having a positive angle of incidence with respect to the line of thrust, a float provided with a tail portion having its keel line extended upwardly and rearwardly at an angle to said thrust line of not less than 6°, said float, in its entirety having a permanent setting at a negative angle with respect to said thrust line, together with means operable to increase the lift value of said supporting surface whereby, in effecting a slow speed landing of the aeroplane, the lift value of the supporting surface may not only be increased but in addition, a high lift angle exceeding 6° may be accorded said supporting surface.

6. In a convertible land and water aeroplane, the combination of a supporting surface having a positive angle of incidence of not less than 2° with respect to the line of thrust, a float provided with a tail portion having its keel line extended upwardly and rearwardly at an angle to said thrust line of at least 8°, said float in its entirety, having a permanent setting at a negative angle with respect to said thrust line of at least 3°, together with means operable to increase the lift value of said supporting surface to an extent equal at least to a 3° increase in the incidence setting of said supporting surface whereby, in effecting a slow speed landing a lift value equal at least to the lift obtained at the stalling angle of the aeroplane may be accorded the supporting surface.

In testimony whereof I hereunto affix my signature.

WILLIAM L. GILMORE.